United States Patent
Rykowski et al.

[11] Patent Number: 6,095,668
[45] Date of Patent: Aug. 1, 2000

[54] INCANDESCENT VISUAL DISPLAY SYSTEM HAVING A SHAPED REFLECTOR

[75] Inventors: Ronald F. Rykowski, Woodinville, Wash.; Richard E. Albrecht, Durham, N.C.

[73] Assignee: Radiant Imaging, Inc., Duvall, Wash.

[21] Appl. No.: 08/665,888

[22] Filed: Jun. 19, 1996

[51] Int. Cl.[7] ................................................ F21V 7/00
[52] U.S. Cl. ........................................ 362/350; 362/296
[58] Field of Search ............................ 362/96, 240, 241, 362/249, 294, 267, 373, 375, 812, 247, 237, 345, 238, 243, 252, 235, 311, 245, 367, 350, 296, 341; 313/113

[56] References Cited

U.S. PATENT DOCUMENTS

| | | | |
|---|---|---|---|
| 1,027,306 | 5/1912 | Avery | 362/267 |
| 1,897,202 | 2/1933 | Lehman | 362/329 |
| 2,313,192 | 3/1943 | Decalion | 240/103 |
| 3,455,046 | 7/1969 | Schulenburg | 40/573 |
| 3,840,734 | 10/1974 | Oram | 362/267 |
| 4,021,659 | 5/1977 | Wiley | 313/113 X |
| 4,234,914 | 11/1980 | Boesen | 362/373 |
| 4,345,308 | 8/1982 | Mouyard et al. | 362/245 |
| 4,450,508 | 5/1984 | Carley | 362/375 |
| 4,504,894 | 3/1985 | Reibling | 362/296 |
| 4,536,831 | 8/1985 | English et al. | 362/267 |
| 4,820,956 | 4/1989 | Slobodzian et al. | 362/240 |
| 4,843,527 | 6/1989 | Britt | 362/812 |
| 5,072,349 | 12/1991 | Waniga | 362/240 |
| 5,119,282 | 6/1992 | Meyer et al. | 362/267 |
| 5,138,541 | 8/1992 | Kano | 362/294 |
| 5,229,681 | 7/1993 | Gordin et al. | 313/113 |
| 5,268,828 | 12/1993 | Miura et al. | 362/249 |
| 5,281,889 | 1/1994 | Fields et al. | 313/113 |
| 5,321,417 | 6/1994 | Voelzke et al. | 362/240 |
| 5,400,228 | 3/1995 | Kao | 362/231 |
| 5,410,328 | 4/1995 | Yoksza et al. | 345/82 |
| 5,497,573 | 3/1996 | Stadjuhar et al. | 362/373 |
| 5,515,251 | 5/1996 | Abke | 362/294 |
| 5,646,473 | 7/1997 | Eggink et al. | 313/113 |
| 5,682,448 | 10/1997 | Riser et al. | 362/32 X |
| 5,704,708 | 1/1998 | Barson et al. | 362/367 |
| 5,726,525 | 3/1998 | Friederichs | 313/113 X |
| 5,779,351 | 7/1998 | Erickson et al. | 362/373 |

FOREIGN PATENT DOCUMENTS

| | | | |
|---|---|---|---|
| 446423 | 9/1991 | European Pat. Off. | 362/296 |
| 3136222 | 3/1983 | Germany | 362/294 |

OTHER PUBLICATIONS

"Prostar Advanced Video Display Systems," brochure, 1997, Daktronics, Inc., Brookings, South Dakota, USA.

*Primary Examiner*—Laura K. Tso
*Attorney, Agent, or Firm*—Dorr, Carson, Sloan & Birney, P.C.

[57] ABSTRACT

A visual display sign having a lighting unit that provides high-efficiency light output from a non-point source of light. The reflector in the lighting unit is sealed and has a shaped reflecting surface obtained by generating a curve from a set of predetermined curve reference points. The shaped reflecting surface provides a light output efficiency of about 60 percent from a non-point source of light and spreads the emitted light about eight degrees from the plane of circumference of the reflector. The lighting units are attached to the visual display sign at a downward angle of about eight degrees from the horizontal.

9 Claims, 12 Drawing Sheets

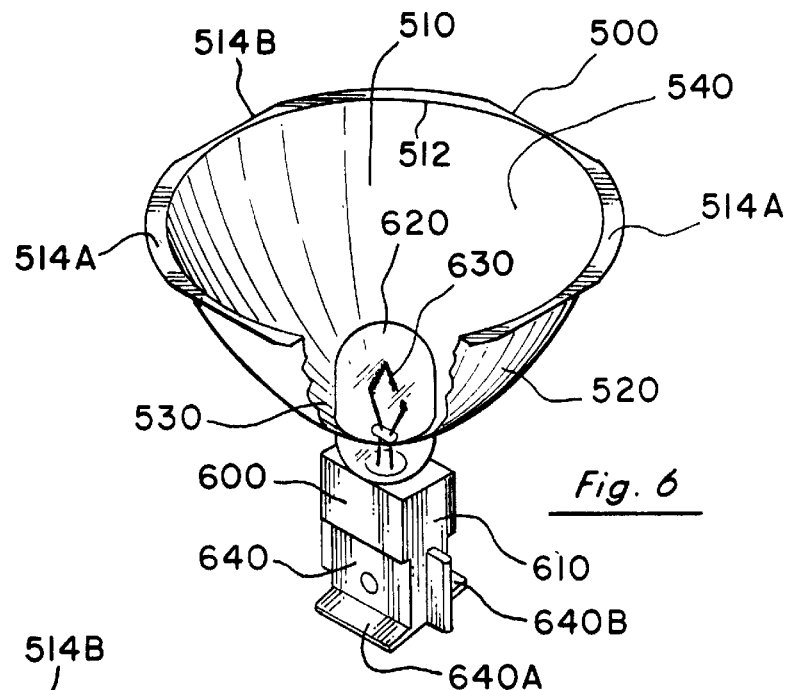
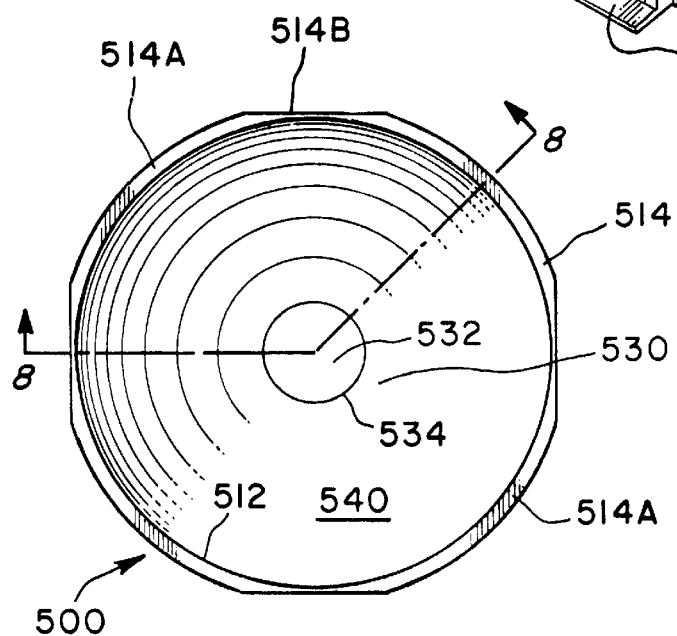
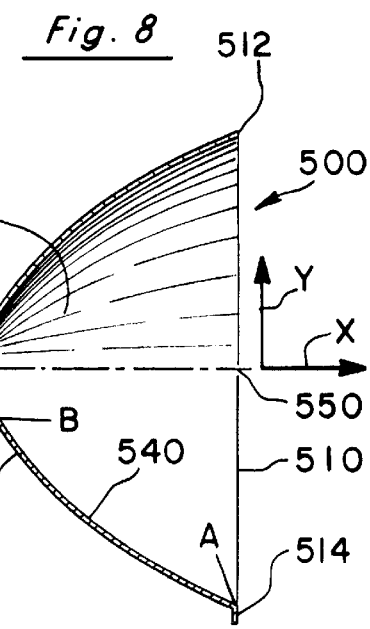

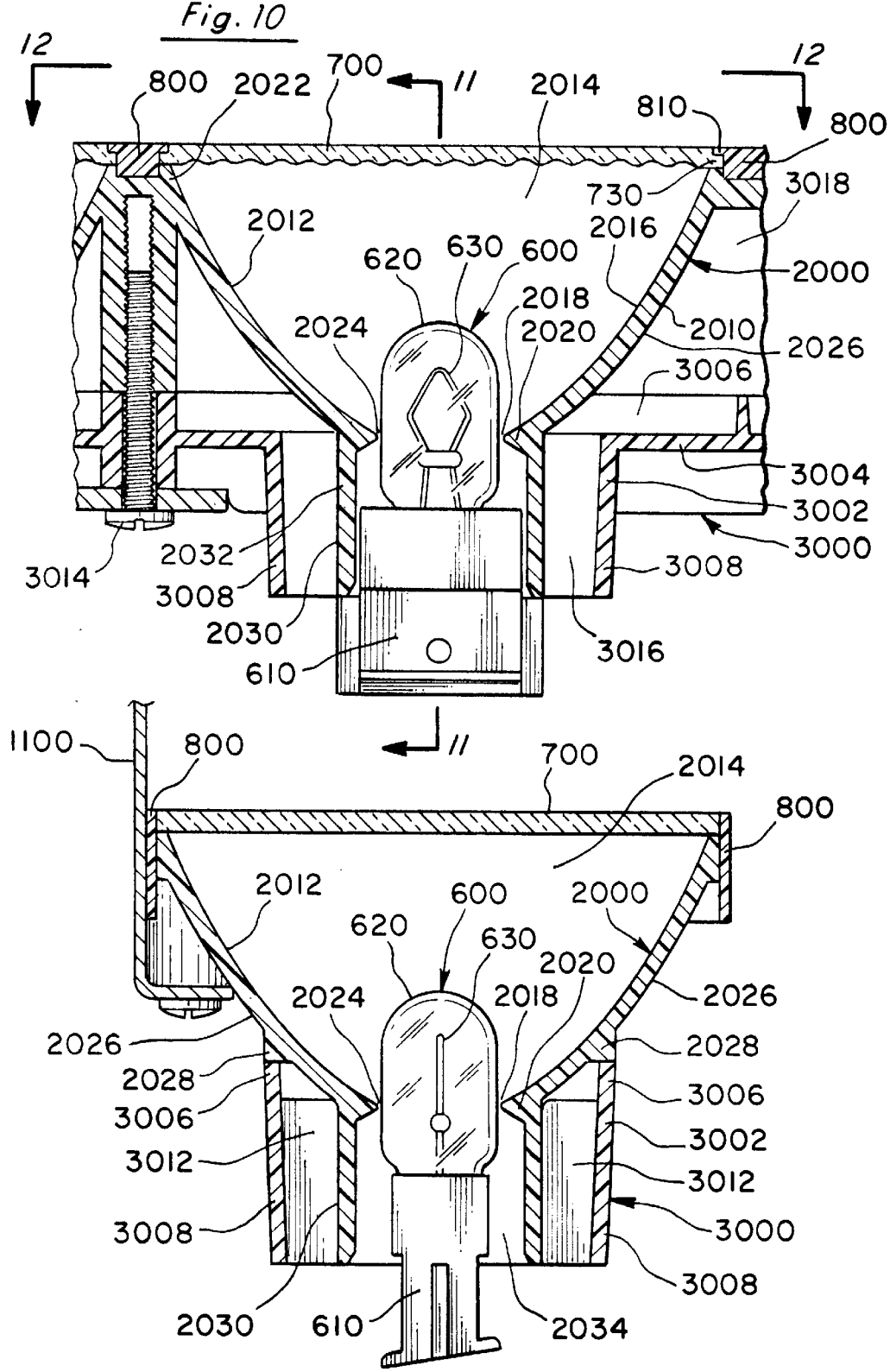

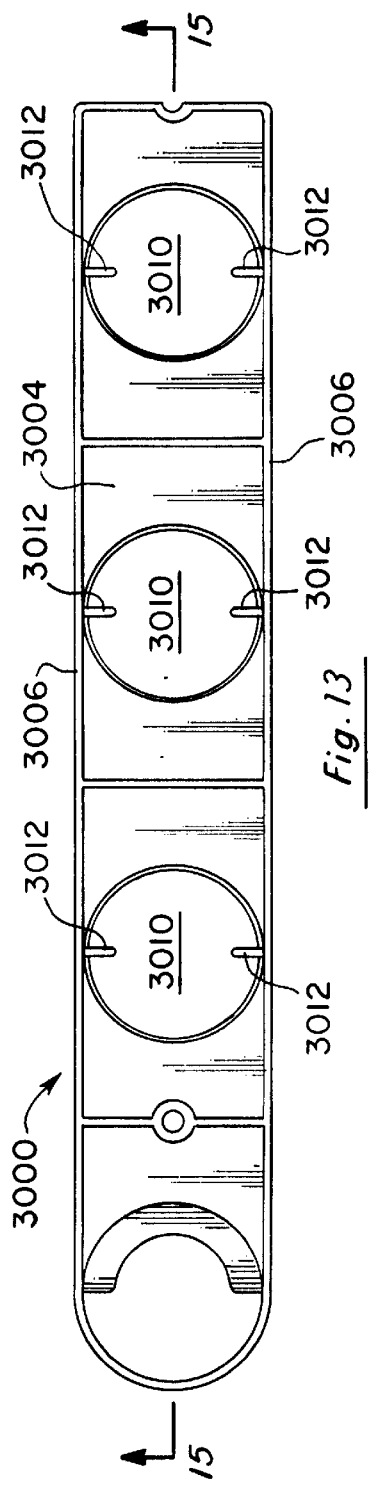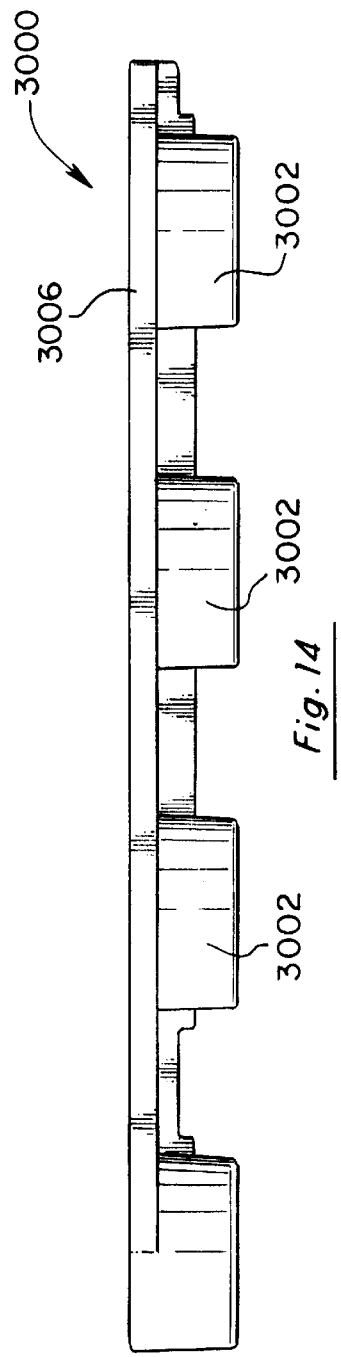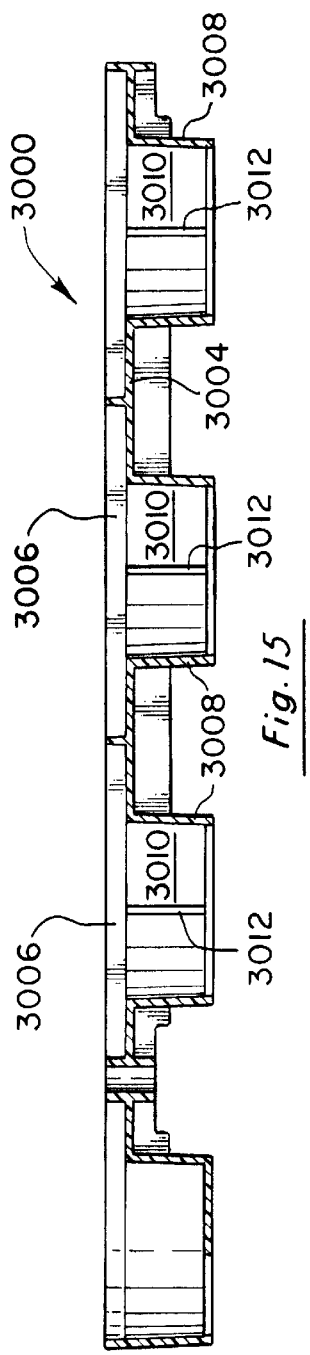

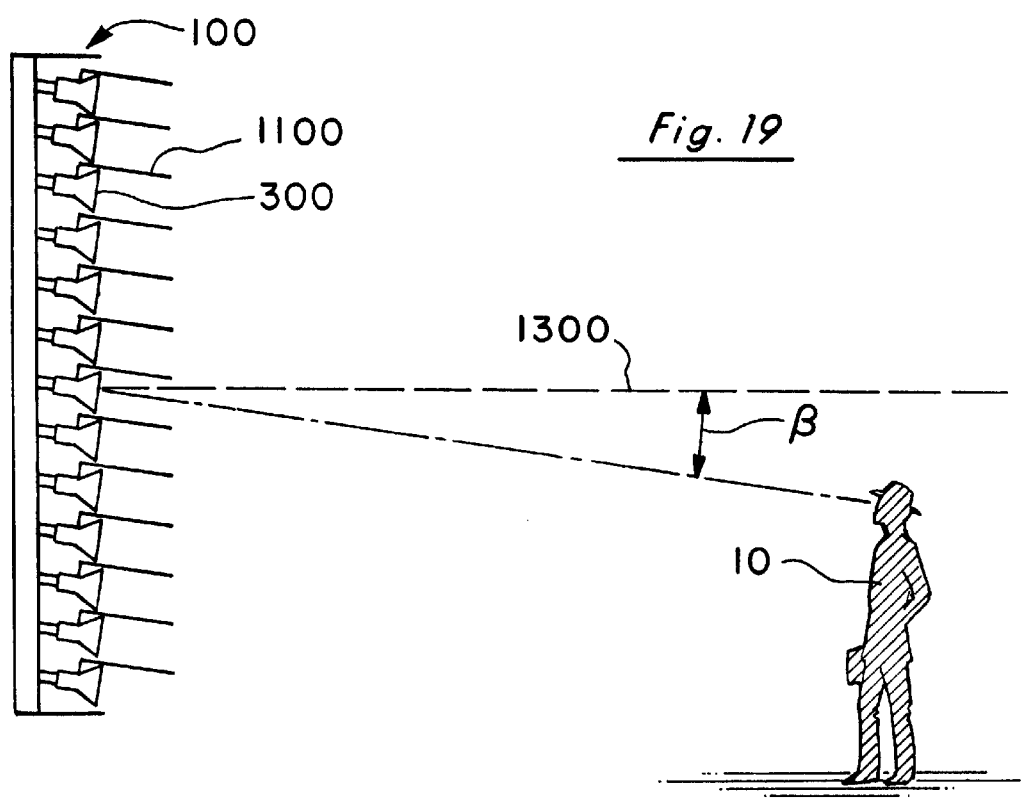

INCANDESCENT VISUAL DISPLAY SYSTEM HAVING A SHAPED REFLECTOR

BACKGROUND OF THE INVENTION

1. Field of the Invention

The present invention relates, in general, to lighting units for visual display signs, and, more particularly, to a reflector for a lighting unit using incandescent bulbs.

2. Statement of the Problem

People have long used outdoor signs for advertising, sending messages to others, and displaying artwork. In early times, carved and painted wooden signs were hung outside of taverns and inns to advertise their presence and accessibility for travelers. In more recent times, large billboards are erected near highways and messages are painted on the sides of barns or other large buildings to capture the attention of passing motorists. Such large billboards present an advertisement or message in a static form. That is, the billboard is most often painted or has a previously prepared advertisement attached to it. The message remains on the sign until it is desired to replace the message with a different communication. These billboards are often illuminated during the hours of darkness in order to reach even more viewers. Such illumination is usually achieved with incandescent or other very bright lights.

Many advertisers, however, desire to change their messages more often than is possible with a billboard that must be repainted each time the message is changed. Advertisers also desire to prepare their own unique messages or to use a moving display as opposed to a static picture. Thus, a need exists for large visual display signs showing moving images that can be located outdoors at remote locations such as on a building or a freestanding pylon.

Although visual display systems exist providing moving images in color, for example, a television show or videotape, such display signs have not provided vivid video images, especially those that are used outdoors. Previous signs designed for outdoor use have been prohibitively expensive to operate, to purchase, and to maintain. Lack of brightness is a serious problem for prior outdoor display signs. Light from other sources, especially the sun and the moon, but also including, but not limited to, other lights on the ground or on adjacent buildings, reduces the ability of viewers to perceive the picture displayed by the sign. These outdoor display signs are comprised of a plurality of lighting units, some of which are turned off, and therefore black, at any particular moment, and some of which are lit in order to show the picture. Ambient light reduces the contrast of the sign in two ways. First, when a lighting unit is off, the blackness of the lighting unit is only as dark as the ambient light. Second, when a lighting unit is lit, its colors mix with the ambient light. Thus, external light washes out the picture, causing the viewer to have difficulty perceiving the picture being displayed, especially when that picture is a moving picture in color. Thus, a need exists for a lighting unit that will increase the light output of a visual display sign, without using expensive components. A need exists to reduce operating costs with reduced power requirements and a need exists to reduce maintenance costs.

One method to increase light output from lighting units in visual display signs is to provide the lighting unit with a reflector that reflects the light emitted by the incandescent light source. Many reflectors for such lighting units are parabolic. These parabolic reflectors would provide the most efficient light output from a point source of light. However, the available incandescent light sources are not truly point sources; in currently available light bulbs, the filaments that emit the light comprise a variety of shapes. Thus, a need exists for a lighting unit that has a reflector with a predetermined shape designed to provide maximum light output from a non-point source of incandescent light.

A patentability search for lighting units having a predetermined reflector shape resulted in the following patent. U.S. Pat. No. 2,313,192 to Decalion teaches a reflector with which the maximum flux is utilized for a given depth of the reflector. The reflector is constructed as follows. The light source is positioned on the axis of the reflector at a certain point. If $d_1$ and $d_2$ are the distances from that point to the edges of the reflector in a plane passing through the axis, and $R_1$ and $R_2$ are the distances of these edges to the axis, the following condition must be met:

$$(d_1/d_2)^3 = (R_1/R_2)^2$$

In addition to their difficulties in seeing moving pictures on outdoor display signs under lighting conditions that wash out the light emitted from the sign, viewers on the ground often find it difficult to see the picture on a visual display sign when they are viewing the sign from an angle other than directly in front of the sign, for instance, if they are standing below and close to the sign or passing by the side of the sign, because most of the light emitted from the lighting units is directed horizontally from the front of the sign or is diffused too far around the edges of the lighting units. Thus, a need exists for a lighting unit that directs the emitted light downward toward viewers below and in front of the visual display sign and in which the reflector is designed to emit light at a predetermined angle. A patentability search for angled lighting units and for reflectors emitting light at a predetermined angle resulted in the following patents:

U.S. Pat. No. 5,400,228 to Kao discloses a full-color illuminating unit including a circuit board and a plurality of red and green lights disposed around a central blue light. A protrusion above the illuminating unit acts as a shade to block sunlight. The entire illuminating unit is positioned at a downward angle against a vertical backing so that the light emitted from the illuminating unit can project to the ground in an appropriate angle (see FIG. 3).

U.S. Pat. No. 5,410,328 to Yoksza et al. teaches a display comprising a plurality of LED modules. Each module is attached to the vertical wall of the display is such a manner that the module angles downward (see FIG. 2A).

U.S. Pat. No. 4,504,894 to Reibling discloses a reflective surface contoured to control the angle of emanation of the light rays from the lighting unit, with a cutoff of 65 degrees from the vertical axis.

A need therefore exists for an affordable lighting unit for use in visual display signs that provide highly visible moving pictures at the NTSC standard 30 images per second both indoors and outdoors under all lighting conditions. Such a lighting unit should provide a highly efficient light output that is directed at an angle to the ground, so that the pictures displayed can be easily seen by viewers below the sign.

Solution to the Problem

Under the teachings of the present invention, a visual display sign is disclosed having a lighting unit that provides an efficient light output directed toward ground-based viewers. The reflector in this lighting unit is nearly completely sealed, and has a shaped reflecting surface obtained from a set of predetermined curve reference points. The shaped reflecting surface depends on the shape of the filament in the light bulb within the reflector and the desired beam divergence. The reflector having this shaped reflecting surface emits light at an efficiency of about sixty percent (60%). The reflector produces a slightly elliptical spot having eight degrees vertical divergence and twelve degrees horizontal divergence.

The lighting units have a downward angle of about eight degrees from the horizontal. Visual display signs using lighting units according to the present invention provide a bright and consistent image to viewers below or at a distance from the visual display sign.

SUMMARY OF THE INVENTION

The present invention comprises a visual display sign having a plurality of lighting units. In a first embodiment, each of the lighting units comprises a reflector positioned within a surrounding shroud. Both the reflector and the shroud have open front ends. The reflector is spaced from the shroud, forming a plenum between the rear surface of the reflector and the open curved surface of the shroud.

An incandescent light source extends through a formed opening in the back of the reflector so that the base of the light source is supported by the shroud while the bulb extends into the open front of the reflector. The edge of the formed opening in the back of the reflector is substantially aligned with the bottom of the filament within the bulb. A narrow space is left around the edge of the formed opening in the back of the reflector when the bulb is fitted into the formed opening.

In a second embodiment of the lighting unit, the reflector has a first section and a second section. The first section comprises an open front and a shaped reflecting surface. The second section supports the base of the light source while the bulb extends through a formed opening in the back of the first section of the reflector.

A lens seals the open front of the reflector when the lens is placed over the open front end of the reflector. The lens is held on the reflector by a bezel surrounding the open front of the reflector. The bezel, in addition to securing the lens, also covers the open front end of the shroud of the first embodiment of the lighting unit.

The reflector has a shaped internal reflecting surface opposing its rear surface. The internal reflecting surface has a predetermined shape designed to most efficiently reflect light emitted by the particular shape of the filament in the light bulb. The reflector shape is obtained by following a set of predetermined curve reference points. This predetermined reflector shape emits light at an efficiency of about sixty percent (60%). The predetermined reflector shape also spreads the light emitted from the reflector to produce a slightly elliptical pattern having eight degrees vertical divergence and having twelve degrees horizontal divergence. This assists in directing light toward viewers who are below or to one side of the display sign. Both effects of the reflector, the increased light output and the light spread, increase the amount of light directed toward a viewer, thus increasing the visibility of the moving image displayed on the visual display sign. This also enables the use of a lower wattage bulb.

The lighting units are positioned in the visual display sign such that each lighting unit is angled downward about eight degrees from the horizontal. As a result of this downward angle, the emitted light is directed downward, and glare from other light sources is decreased. The approximately eight-degree angle and the decrease in glare, in addition to the efficient light output and twelve-degree horizontal spread of emitted light by the reflector, increase delivery of light from the visual display sign to viewers on the ground.

It is an object of the present invention to provide a visual display sign that delivers a high-quality image to viewers who are at a distance from or not directly in front of the sign.

It is another object of the present invention to provide for the lighting units in a display sign a reflector that has a predetermined shape that more accurately reflects light based upon the specific shape of the filament of the light source in order to increase the efficiency of light output from the reflector.

It is an object of the present invention to provide the reflector with a predetermined shape that, in addition to increasing the efficiency of the light output, also spreads the emitted light by a predetermined pattern beyond the planar circumference of the rim of the reflector.

These and other advantages, features, and objects of the present invention will be more readily understood in view of the following detailed description and the drawings.

BRIEF DESCRIPTION OF THE DRAWING

FIG. 6 is a cut-away perspective view of a reflector and light source according to the present invention.

FIG. 7 is a front view of the reflector of FIG. 6.

FIG. 8 is a cut-away side view of the reflector of FIG. 6 shown substantially along section line 8—8 of FIG. 7.

FIG. 10 shows a cross-sectional view of a second embodiment of the lighting unit of the present invention shown substantially along section line 10—10 of FIG. 12.

FIG. 11 is a cross-sectional view of the second embodiment of the lighting unit shown substantially along line 11—11 of FIG. 10.

FIG. 13 is a top view of an air diffuser.

FIG. 14 is a side elevational of the air diffuser of FIG. 13.

FIG. 15 is a cross-sectional view of the air diffuser shown substantially along line 15—15 of FIG. 13.

FIG. 19 is a side view of the relationship between the visual display sign of the present invention and a viewer located on the ground.

DETAILED DESCRIPTION OF THE DRAWING

1. Overview.

Figure 1:
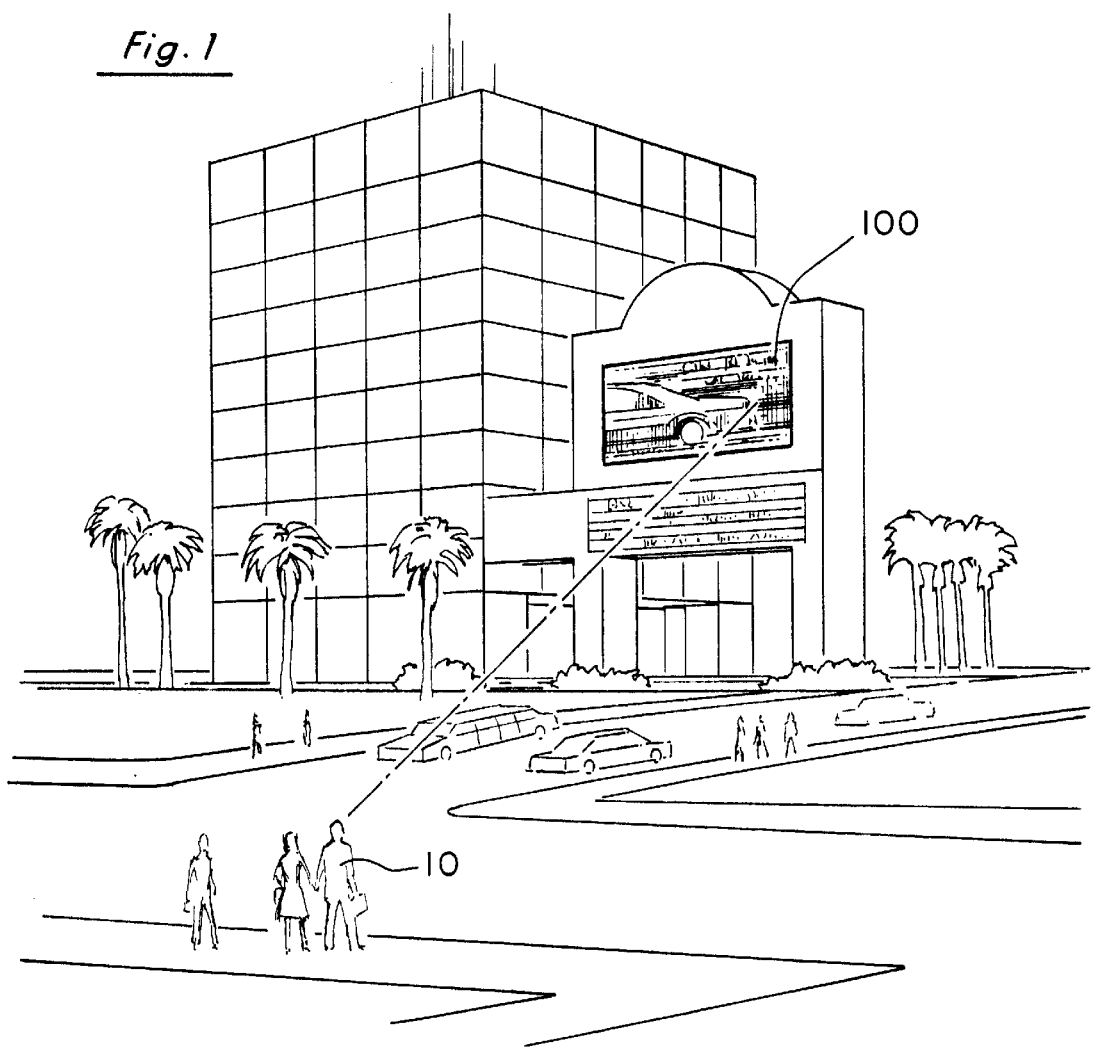
FIG. 1 is a perspective view of a visual display sign in accordance with the teachings of the present invention.

Turning to FIG. 1, a visual display sign 100 in accordance with the present invention is shown. Although the display sign 100 in FIG. 1 is shown as being in a preferred outdoor location, it is to be understood that the display sign 100 is not limited to outdoor placement but may also be situated within a structure, and that the surrounding elements and support structure may vary from those shown in FIG. 1. For example, the display sign 100 can be placed flat against the exterior wall of a building or the interior wall of a room, or hang freely from the ceiling within a room, or stand atop the roof of a building. The display sign 100 is preferably situated to be easily visible to viewers 10 who may be at some distance from and below the display sign 100.

Figure 2:
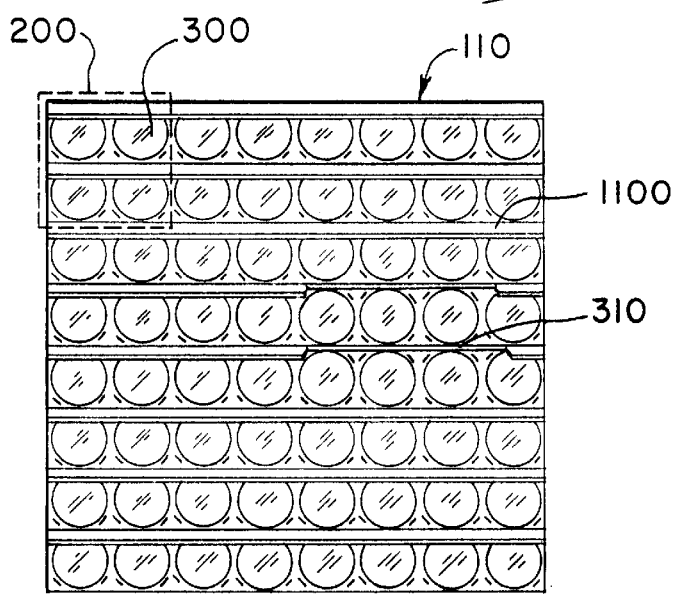
FIG. 2 is a partial front view of a module of the visual display sign of FIG. 1.

FIG. 2 illustrates a module 110 of the most preferred embodiment of the visual display sign 100. Each module 110 preferably comprises sixteen pixels 200, and each pixel 200 in turn comprises four individual lighting units 300 arranged in a square two across and two deep, for a total of sixty-four lighting units 300 in a module 110. Each lighting unit 300 in first embodiment has dimensions of approximately two inches by two inches. In a second embodiment, each lighting unit 300 has dimensions of approximately one inch by one inch. Hence, each pixel 200 in the first embodiment is approximately four inches by four inches, and each module 110 in the first embodiment has dimensions of approximately sixteen inches by sixteen inches, whereas each pixel 200 in the second embodiment has dimensions of approximately two inches by two inches, and each module 110 in the second embodiment has dimensions of approximately eight inches by eight inches. The modules 110 can be interconnected to form a visual display sign 100 of any desired size.

2. First Embodiment of the Lighting Unit 300.

Figure 3:
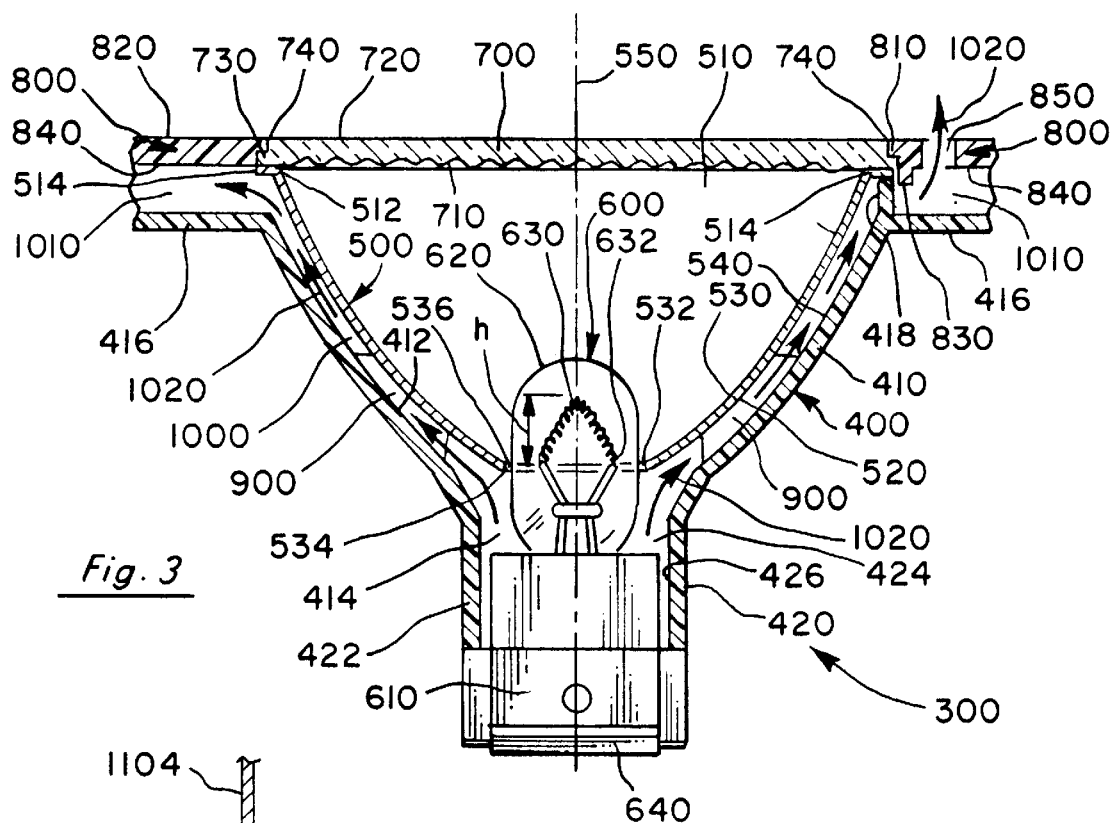
FIG. 3 is a cross-sectional view of a lighting unit in accordance with the teachings of the present invention shown substantially along section line 3—3 of FIG. 5.
Figure 4:
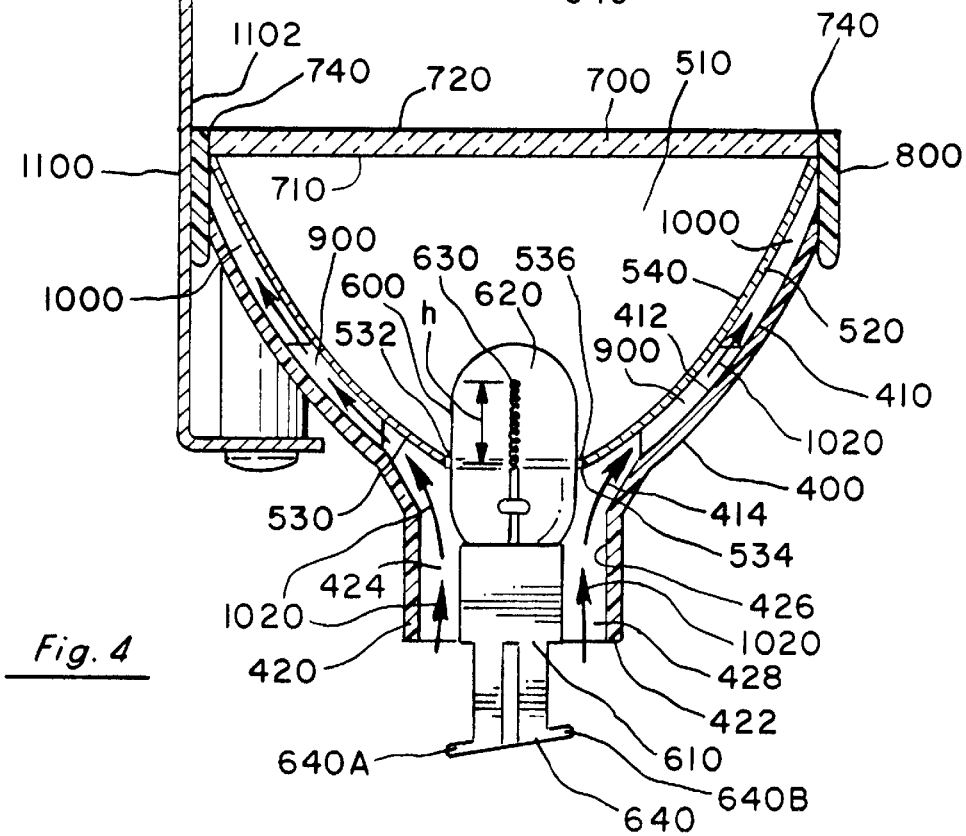
FIG. 4 is a cross-sectional view of a lighting unit shown substantially along section line 4—4 of FIG. 5.

A lighting unit 300 in accordance with a first embodiment of the present invention is shown in FIGS. 3 and 4. The lighting unit 300 comprises a shroud 400 within which is located a reflector 500. An incandescent light source 600 is located within the reflector 500. A lens 700 is placed in front of the light source 600. The lens 700 is held in place by a bezel 800 surrounding the reflector 500.

The shroud 400 has a first section 410 and a second section 420. The first section 410 has an open curved surface 412 terminating in a formed hole 414. The open curved surface 412 is surrounded by a circular rim 416. Positioned around the rim 416 of the shroud 400 and extending above the rim 416 are a plurality of spaced projections 418. The second section 420 has a substantially cylindrical region 422 forming a passageway 424 coextensive with the formed hole 414.

The reflector 500 is positioned substantially within the open curved surface 412 of the shroud 400. The reflector 500 has an open front 510 with a surrounding rim 512. A flange 514 extends outwardly around portions of the rim 512 and abuts the spaced projections 418 of the shroud 400. The rear surface 520 of the reflector 500 is spaced apart from the open curved surface 412 of the shroud 400, forming a plenum 1000 between the rear surface 520 of the reflector 500 and the open curved surface 412 of the shroud 400. The reflector 500 has a back 530 in which is a formed opening 532 having an edge 534. The formed opening 532 in the back 530 of the reflector 500 is substantially aligned along center axis 550 with the formed hole 414 of the first section 410 of the shroud 400 when the reflector 500 is positioned within the open curved surface 412 of the shroud 400. A shaped internal reflecting surface 540 opposes the rear surface 520 of the reflector 500. The shaped internal reflecting surface 540 is obtained by following a set of predetermined curve reference points, as described in greater detail below.

The reflector 500 can be made from a heat-resistant plastic on the shaped internal reflecting surface 540 of which a reflective film is applied. In the alternative, the reflector 500 can be made from a heat-resistant, light-weight, reflective metal such as aluminum. Aluminum is more beneficial to remove heat from around the bulb 620, but is more costly. It is to be understood that the present invention is not limited to the use of aluminum or plastic to make the reflector 500 but that any suitable reflective material known to those skilled in the art could be used.

The incandescent light source 600 has a base 610 and has a bulb 620 attached to the base 610. The bulb 620 contains a light-emitting filament 630 therein. The base 610 is disposed within the passageway 424 of the second section 420 of the shroud 400, and the bulb 620 and filament 630 extend into open front 510 of the reflector 500 through the formed opening 532 in the back 530 of the reflector 500. In the preferred embodiment, the light source 600 is a conventional incandescent xenon T3¼ wedge base lamp. However, it is to be understood that other incandescent light sources 600 could be used in the present invention and that the present invention is not meant to be limited by this particular description.

The coiled filament 630 emitting the light forms an inverted V shape having a predetermined height h. This inverted V is made of very fine wire formed into a coil throughout the length of the inverted V. The bulb 620 extends into the open front 510 of the reflector 500 until the edge 534 of the formed opening 532 in the back 530 of the reflector 500 is substantially aligned with the bottom 632 of the inverted V filament 630, as shown in FIG. 3. A narrow space 536 remains between the bulb 620 and the edge 534 of the formed opening 532. This positioning of the filament 630 within the reflector 500 maximizes the light-emitting efficiency of the reflector 500, as discussed in greater detail below.

The base 610 of the light source 600 is substantially rectangular. On the short side of the rectangle (FIG. 3), the base 610 is securely held within the passageway 424 of the second section 420 of the shroud 400, while on the long side of the rectangular base 610 (FIG. 4), a space 428 is found between the side 426 of the passageway 424 and the base 610 of the light source 600.

The foot 640 of the base 610 of the light source 600 projects beyond the second section 420 of the shroud 400. As FIG. 4 shows, one side of the foot 640A extends further than the opposing side of the foot 640B. The significance of this difference in length is discussed below.

Placed over the open front of the reflector 500 and in front of the light source 600 is a lens 700. This lens 700 has a light-incident surface 710 upon which the light emitted from the light source 600 and reflected by the reflector 500 impinges and a light-emitting surface 720 through which the light is emitted. A lip 730 extends beyond the edge 740 of the lens 700 closer to the light-incident surface 710 of the lens 700. The lip 730 abuts the flange 514 of the reflector 500 when the lens 700 is placed over the open front 510 of the reflector 500, as shown in FIG. 3. The lens 700 thus seals the open front 510 of the reflector 500.

Surrounding the open front 510 of the reflector 500 and covering the open curved surface 412 of the shroud 400 is a bezel 800. The bezel 800 has a lip 810 nearer the front surface 820 of the bezel 800, and a projection 830 extending from the rear surface 840 of the bezel 800 adjacent the lip 810. The lip 810 of the bezel 800 engages the lip 730 of the lens 700, while the projection 830 of the bezel 800 extends past the rim 416 of the shroud 400, past the flange 514 of the reflector 500, and past the lip 730 of the lens 700, as shown in FIG. 3, holding the lens 700 securely in place over the open front 510 of the reflector 500. The bezel 800 when in place also covers the open curved surface 412 of the shroud 400. At least one vent 850 is cut into the bezel 800.

Figure 5:
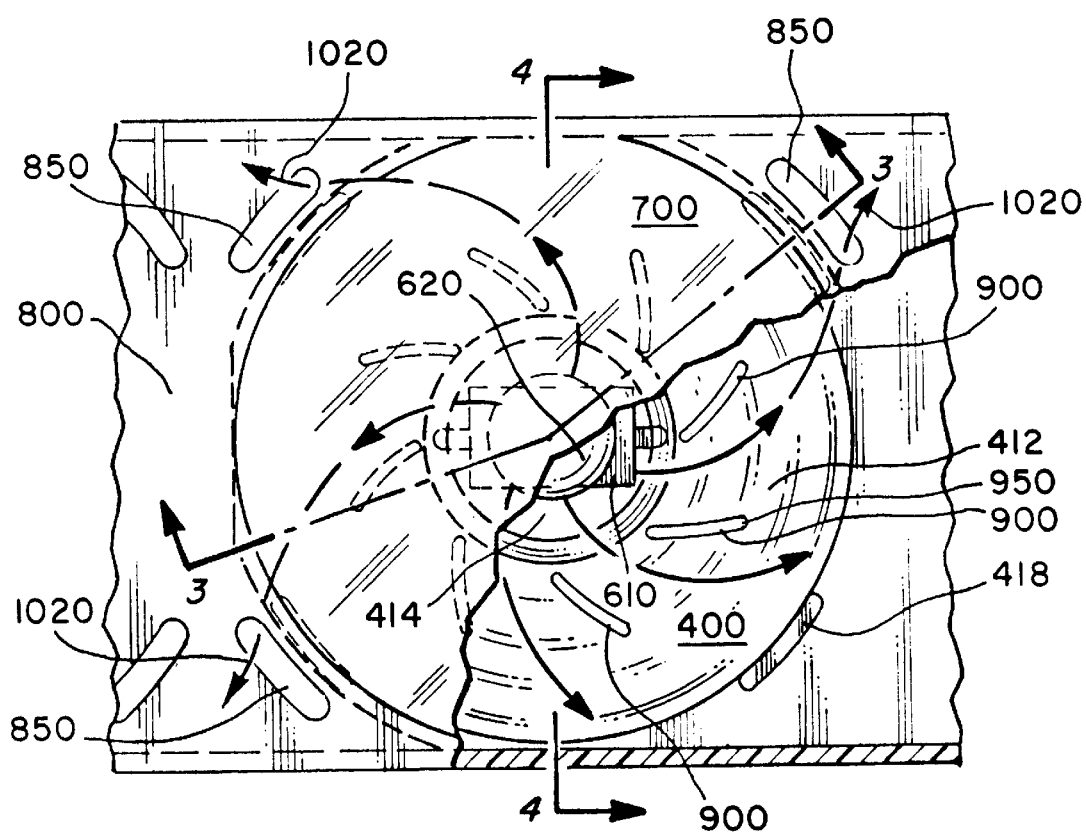
FIG. 5 is a partial cut-away front view of a lighting unit of the present invention.

In the first embodiment illustrated in FIGS. 3 and 4, several vanes 900 are located between the rear surface 520 of the reflector 500 and the open curved surface 412 of the shroud 400. The vanes 900 are arcuate in the preferred design, as shown in FIG. 5. The vanes are molded, in the preferred embodiment, to the shroud 400 and support the reflector 500. It is to be expressly understood that the vanes could be molded to the reflector or comprise a separate structure.

A shade 1100 is attached to the top 310 of the lighting unit 300 as shown in FIG. 2. A portion of the shade 1100 in FIG. 2 is cut away to show the lighting units 300 under the shade 1100. In the first embodiment illustrated in FIG. 4, the surface 1102 of the shade 1100 above the lighting unit 300 is mirrored, while the surface 1104 of the shade 1100 opposing the mirrored surface 1102 has a blackened, light-absorbent surface. The shades 1100 block sunlight and other light from shining directly on the lighting units 300, thus increasing the brightness of the visual display sign 100.

3. Reflector 500 Configuration of the First Embodiment.

An important goal for a visual display sign 100 is to increase the amount of light delivered to the viewer 10. One method of achieving this goal is to increase the power output of the light source used, for example, to use a higher wattage light bulb in each lighting unit. Higher wattage bulbs, however, can be expensive to purchase and in their use of electricity and may also have a shorter life span than the lower wattage light bulbs. Higher wattage bulbs also produce greater heat that must be removed from the display sign 100 to avoid damage of sign 100 parts through melting.

Another method used to increase the delivery of light to the viewer 10 of a display sign is to provide each lighting unit with a reflector. The reflector can be as simple as a mirror or other reflective planar surface placed behind the light bulb to reflect toward the viewer 10 light that otherwise would be directed toward the rear of the lighting unit. Or the reflector can be shaped in a particular way both to gather the light emitted by the light bulb and to direct the output of the light in a desired direction, preferably toward the viewer 10 of the display sign.

A conventional manner in which to shape a reflector is to use a paraboloid shape and to place the light source at the focal point. As the light source comes closer to being a point source, a parabolic reflector provides a greater output of light. However, available light sources are not truly point sources. In most available conventional incandescent light sources, the light is produced by a coiled filament having a predetermined shape, and the filament generally extends topologically over a three-dimensional volume. Thus, only a portion of the light-producing filament is actually found at the focal point of a parabolic reflector. Because of this, a true parabolic reflector is inefficient at increasing light output. In addition, a true parabolic reflector will emit light that is collimated.

To increase the efficiency of light output for each lighting unit 300 over that of previous designs in the art, the reflector 500 of the present invention was devised. FIGS. 6 through 8 illustrate the structure of the reflector 500 in the first embodiment of the present invention. The reflector 500 is shaped to optimally reflect in a desired pattern based on the structure of the filament 630. As described in detail above, the bulb 620 of the light source 600 extends through a formed opening 532 in the back 530 of the reflector 500 such that the edge 534 of the formed opening 532 is substantially aligned with the bottom 632 of the filament 630, as can be seen in FIG. 6. Only a narrow space 536 (FIG. 3) remains between the reflector 500 and the bulb 620 when the bulb 620 extends through the formed opening 532.

The front 540 of the reflector 500 is open and has a substantially circular rim 512. Surrounding the rim 512 is a flange 514. As shown in FIG. 7, the flange 514 varies in width, becoming wider 514A at four quadrant areas spaced equidistantly around the rim 512 ninety degrees apart and correspondingly becoming narrower 514B at four quadrant areas spaced equidistantly around the rim 512 between the wider areas 514A. The wider areas 514A are forty-five degrees apart from the narrower areas 514B. The wider areas 514A of the flange 514 abut the projections 418 of the shroud 400 when the reflector 500 is positioned within the shroud 400, as illustrated in FIG. 3 and described in more detail above.

The shape of the shaped internal reflecting surface 540 of the reflector 500 is determined by generating a curve that is then rotated through three hundred and sixty degrees. The x-y values are empirically generated. The filament 630 has a predetermined height h and acts as a line source of light. Some of the light rays travel from the filament 630 to the shaped internal reflecting surface 540 of the reflector 500, some pass directly out the open front 510 of the reflector 500, and a few rays pass through the formed opening 532 in the back 530 of the reflector 500. Based on the predetermined height h of the filament 630, the most efficient reflecting surface 540 shape can be determined for the filament 630 used in the lighting source 600.

The curve AB that provides the shaped internal reflecting surface 540 having the most efficient light output is shown in FIG. 8 and is defined by twenty-four points whose positions are indicated by abscissa and ordinate values (values are in inches) that are described in the following Table I. The origin (x,y)=0,0 is located on the center axis 550 of the reflector 500 where the axis 550 crosses the open front 510 of the reflector 500. The values below are based on a reflector having an approximately two-inch-diameter open front.

TABLE I

| Curve Reference Point | x (inches) | y (inches) |
| --- | --- | --- |
| 1 (corresponding to point A) | 0.0000 | −0.9000 |
| 2 | −0.0182 | −0.8917 |
| 3 | −0.0547 | −0.8750 |
| 4 | −0.0909 | −0.8580 |
| 5 | −0.1395 | −0.8345 |
| 6 | −0.1877 | −0.8105 |
| 7 | −0.2356 | −0.7858 |
| 8 | −0.2831 | −0.7603 |
| 9 | −0.3303 | −0.7341 |
| 10 | −0.3769 | −0.7071 |
| 11 | −0.4230 | −0.6792 |
| 12 | −0.4686 | −0.6504 |
| 13 | −0.5135 | −0.6205 |
| 14 | −0.5576 | −0.5896 |
| 15 | −0.6009 | −0.5574 |
| 16 | −0.6432 | −0.5240 |
| 17 | −0.6843 | −0.4892 |
| 18 | −0.7241 | −0.4528 |
| 19 | −0.7623 | −0.4147 |
| 20 | −0.7986 | −0.3749 |
| 21 | −0.8326 | −0.3331 |
| 22 | −0.8640 | −0.2892 |
| 23 | −0.8920 | −0.2432 |
| 24 (corresponding to point B) | −0.9161 | −0.1950 |

The reflector solid is obtained by rotating the curve AB generated by the points in Table I through 360 degrees around the center axis 550.

The efficiency of the reflector 500 of the first embodiment of the present invention is about sixty percent, as measured by the software program. Of the remaining forty percent of the light emitted by the filament 630, approximately fifteen percent to twenty percent passes through the formed opening 532 in the back 530 of the reflector 500. The rest is delivered directly through the lens 700 without reflection.

Figure 9A:
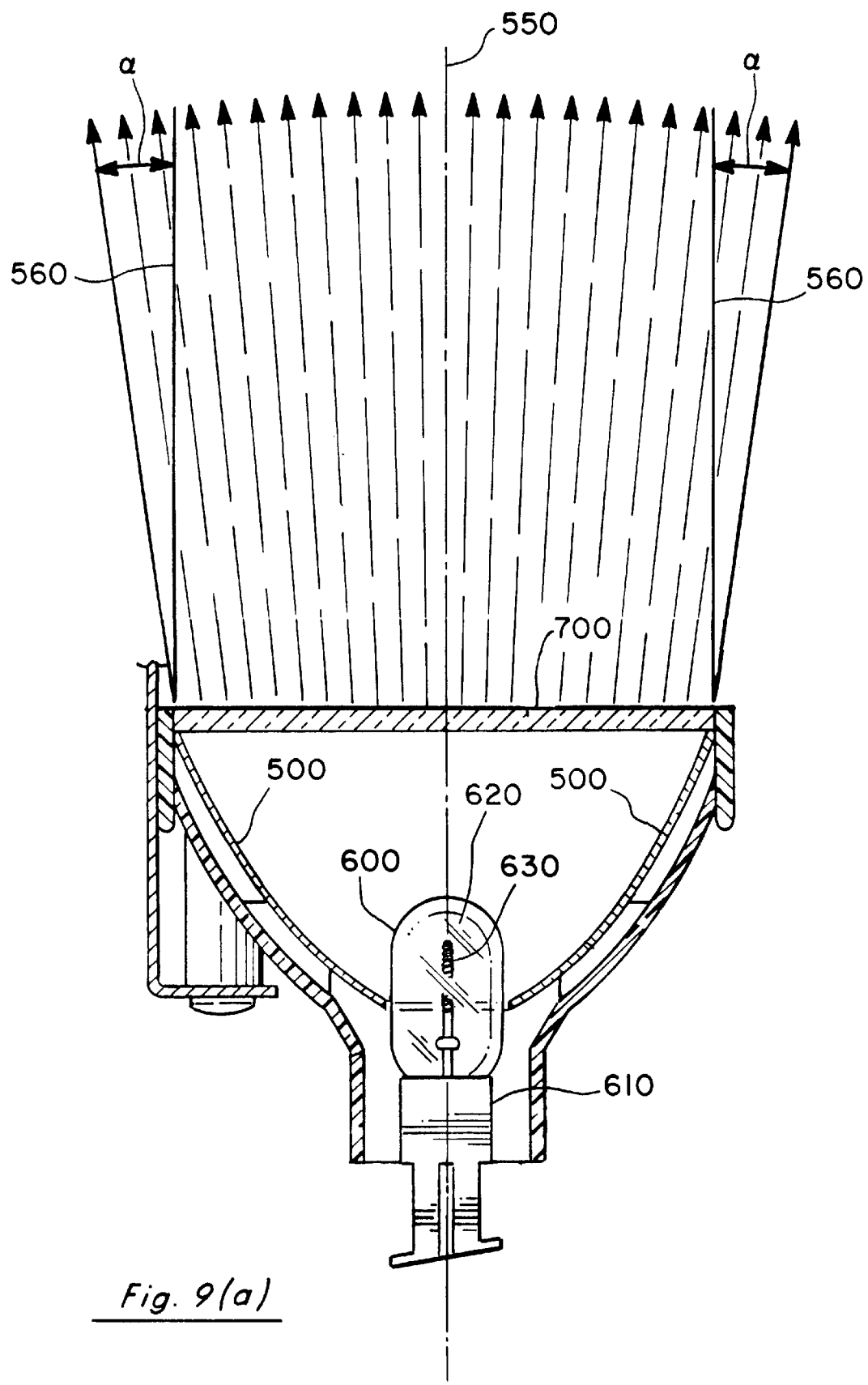
FIG. 9A is a cross-sectional view of a lighting unit illustrating the spread of light emitted.
Figure 9B:
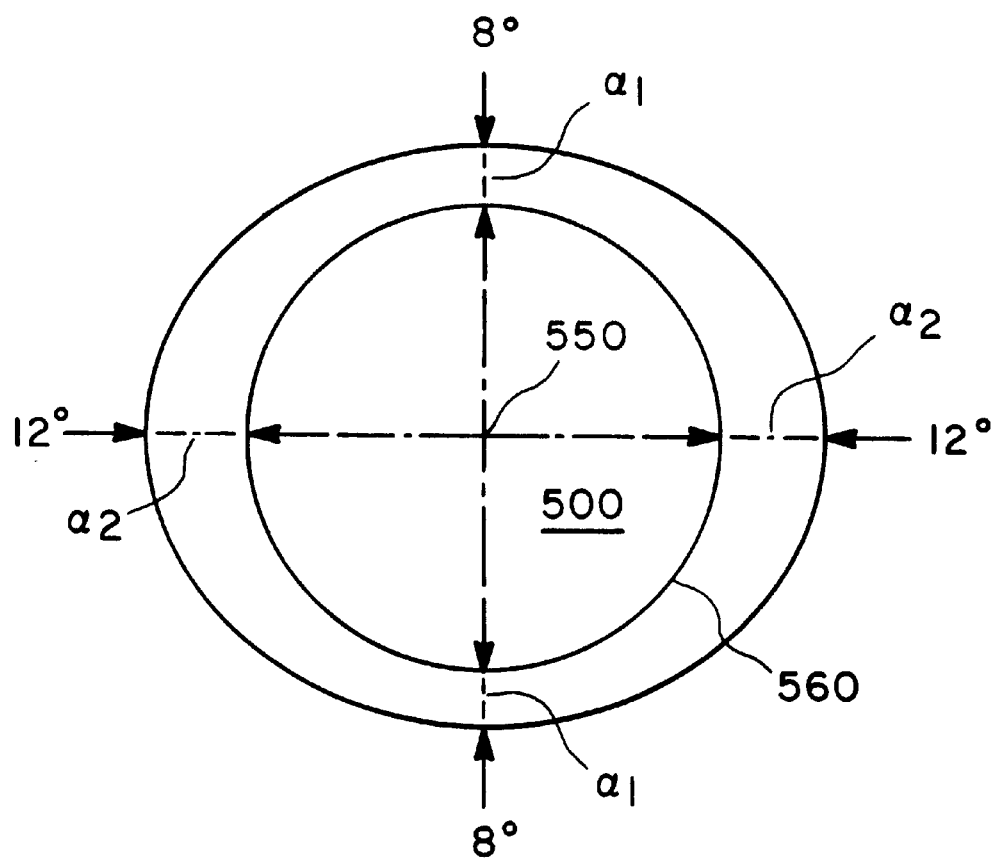
FIG. 9B is a front view of a reflector illustrating the spread of light emitted.

In addition to an efficient light output, the reflector 500 of the present invention specifically directs the light emitted in a predetermined pattern as shown in FIG. 9B. As shown in FIG. 9A, the emitted light is largely parallel near the center axis 550 of the reflector but gradually spreads as the plane of circumference 560 of the reflector 500 is approached. FIG. 9B illustrates the pattern of light emitted by the reflector 500. The reflector 500 spreads the light substantially elliptically around the plane of circumference 560, by a predetermined angle α. Angle $\alpha_1$, in the vertical direction is about eight degrees and angle $\alpha_2$ in the horizontal direction is about twelve degrees from the plane of circumference 560 of the reflector 500.

For a visual display sign 100 having shades 1100 as described above, a portion of the approximately eight-degree vertical components of the light spread from the reflector 500 is either reflected downward toward a viewer 10 below the visual display sign 100 by the mirrored surface 1102 of the shade 1100 above the lighting unit 300 or absorbed by the blackened, light-absorbent surface 1104 of the shade 1100 below the lighting unit 300. The remainder of the approximately eight-degree vertical spread of light does not impinge upon the shades 1100. The approximately twelve-degree horizontal components of the light spread from the reflector 500 increase the amount of light delivered to those viewers 10 who are not situated directly in front of the display sign 100 but rather may be off to one or the other side of the display sign 100.

4. Cooling System of the First Embodiment.

In prior visual display signs and lighting units, the heat generated by the light sources in the lighting units was dissipated by forcing air through the space between the reflector and the light bulb, across the front surface of the reflector and the surface of the light bulb, and out the front of the lighting unit. The impetus for the forced air was, for example, a fan or a source of pressurized air. In these prior systems, dust in the forced air gradually builds up on the reflective inner surface of the reflector, on the surface of the light bulb, and on the lens or other cover in front of the light bulb. This dust buildup results in a diminution in the light output of the lighting unit over time and also results in costly and time-consuming cleaning.

FIGS. 3 through 5 illustrate the first embodiment of the cooling system of the lighting unit 300 for the visual display sign 100 of the present invention. When the reflector 500 is positioned within the open curved surface 412 of the shroud 400, the rear surface 520 of the reflector 500 is spaced apart from the open curved surface 412 of the shroud 400. This relative positioning of the reflector 500 and the shroud 400 forms a plenum 1000 between the rear surface 520 of the reflector 500 and the open curved surface 412 of the shroud 400. The plenum 1000 is in fluid communication with the passageway 424 within the second section 420 of the shroud 400. The plenum 1000 extends past the open curved surface 412 of the shroud 400 to be in fluid communication with the area 1010 between the rim 416 of the shroud 400 and the overlying bezel 800, as can be seen in FIG. 3. This extension 1010 of the plenum 1000 is formed when the bezel 800 is positioned over the open curved surface 412 of the shroud 400. The plenum 1000 is further in fluid communication with the vents 850 in the bezel 800.

To provide the necessary cooling of the lighting unit 300, air is introduced into the display sign 100. The air can be supplied by, for example, a fan or by another source such as compressed air from a bottle or pump. The air is introduced into the passageway 424 of the second section 420 of the shroud 400 through the space 428 (FIG. 4) between the base 610 of the light source 600 and the side 426 of the passageway 424 as illustrated by the arrows 1020 in FIG. 4. The air then moves into the plenum 1000 and travels along the rear surface 520 of the reflector 500. As shown by the arrows 1020 in FIG. 3, the air then moves into the extension 1010 of the plenum 1000 between the rim 416 of the shroud 400 and the bezel 800. As described above, the bezel 800 contains a plurality of vents 850. In the first embodiment shown in FIG. 5, the bezel 800 contains four vents 850 spaced around each lighting unit 300. The air, after flowing along the rear surface 520 of the reflector 500 and picking up the heat radiated by the reflector 500, exits the plenum 1000 through the vents 850 in the bezel 800, as shown in by the arrows 1020 in FIGS. 3 and 5. As discussed above, the reflector 500 is preferably made from aluminum, which assists in the removal of heat.

Without air flow 1020, the rear surface 520 of the reflector 500 directly opposite the bulb 620 of the light source 600 has a maximum temperature of about three hundred and eighty degrees Fahrenheit as measured with a thermocouple. During cooling as described above, the temperature of the rear surface 520 of the reflector 500 decreases to an acceptable level to prevent damage to the lighting unit 300.

FIG. 5 is a front cutaway view of a lighting unit 300 according to the present invention showing the placement and structure of the vanes 900. As can be seen in FIG. 5, in the preferred embodiment eight vanes 900 are equally spaced and circumferentially positioned between the rear surface 520 of the reflector 500 and the open curved surface 412 of the shroud 400. It should be noted that although there are eight vanes 900 in the preferred embodiment illustrated in FIG. 5, any number of vanes 900 are contemplated under the teachings of the present invention. The vanes 900 are arcuate and are positioned such that one end of the vane 950 is closer to the bezel 800. As the air flows past the vanes 900, the air is caused to swirl around the rear surface 520 of the reflector 500 as shown by the arrows 1020 in FIG. 5. This swirling of the air increases the area over which the air flows, improving heat exchange from the reflector 500 to the moving air.

The air is prevented from entering the interior of the reflector 500 in the following manner. As described above, the bulb 620 of the light source 600 fits closely within the formed opening 532 in the back 530 of the reflector 500, leaving only a narrow space 536 between the bulb 620 and the edge 534 of the formed opening 532. As the air enters the lighting unit 300 as described above, initially a small amount of the air flows through the narrow space 536 and into the sealed interior of the reflector 500. As the air enters the reflector 500, pressure builds up between the lens 700 and the reflector 500.

In addition to the pressure increase obtained through the action of the air entering the interior of the reflector, the pressure between the lens 700 and the reflector 500 also increases when the air inside the reflector 500 is heated by the light source 600, causing the air to expand. The pressure builds up until the air pressure between the lens 700 and the reflector 500 substantially equals the air pressure of the air entering the lighting unit 300. When the pressures become substantially equal, no additional air is able to enter the sealed interior of the reflector 500. Thus, the air entering the lighting unit 300 is substantially prevented from entering the interior of the reflector 500 and depositing dust on the internal reflecting surface 540 of the reflector 500, on the bulb 620, or on the light-incident surface 710 of the lens 700.

While the first embodiment shows a shroud 400 that encloses a plenum 1000 to define a passageway for air flow terminating in vents 850, it is to be expressly understood that other designs could be utilized due to the sealed nature of the reflector 500 and the bulb 620. For example, as described below, the shroud 400 could be eliminated to provide flowing air directly to the rear surface 520 of the reflector 500.

5. Second Embodiment of Lighting Unit 300.

A second embodiment of the lighting unit 300 is illustrated in FIGS. 10 through 16. (Reference numbering for the second embodiment is identical to that for the first embodiment when possible.) The lighting unit 300 in the second embodiment comprises a reflector 2000 and an air diffuser 3000. An incandescent light source 600 is located within the reflector 2000. A lens 700 is placed in front of the light source 600. The lens 700 is held in place by a bezel 800 surrounding the reflector 2000.

FIGS. 10 and 11 illustrate the second embodiment of the lighting unit 300 in more detail. The reflector 2000 has a first section 2010 and a second section 2030. The first section 2010 comprises a shaped reflecting surface 2012 with an open front 2014 and a back 2016 terminating in a formed opening 2018 having an edge 2020. The open front 2014 is surrounded by a circular rim 2022. The shaped reflecting surface 2012 is obtained by following a set of predetermined curve reference points, as described in greater detail below. The second section 2030 comprises a substantially cylindrical region 2032 forming a passageway 2034 coextensive with the formed opening 2018. The edge 2020 of the formed opening 2018 extends into the passageway 2034, as shown in FIGS. 10 and 11.

The reflector 2000 can be made from a heat-resistant reflective plastic or a plastic on the shaped reflecting surface 2012 of which a reflective film is applied. Alternatively, the reflector 2000 can be made from a heat-resistant, lightweight, reflective metal such as aluminum. Aluminum is more beneficial to remove heat from around the bulb 620, but is more costly. It is to be understood that the present invention is not limited to the use of aluminum or plastic to make the reflector 2000 but that any suitable reflective material known to those skilled in the art could be used.

Figure 12:
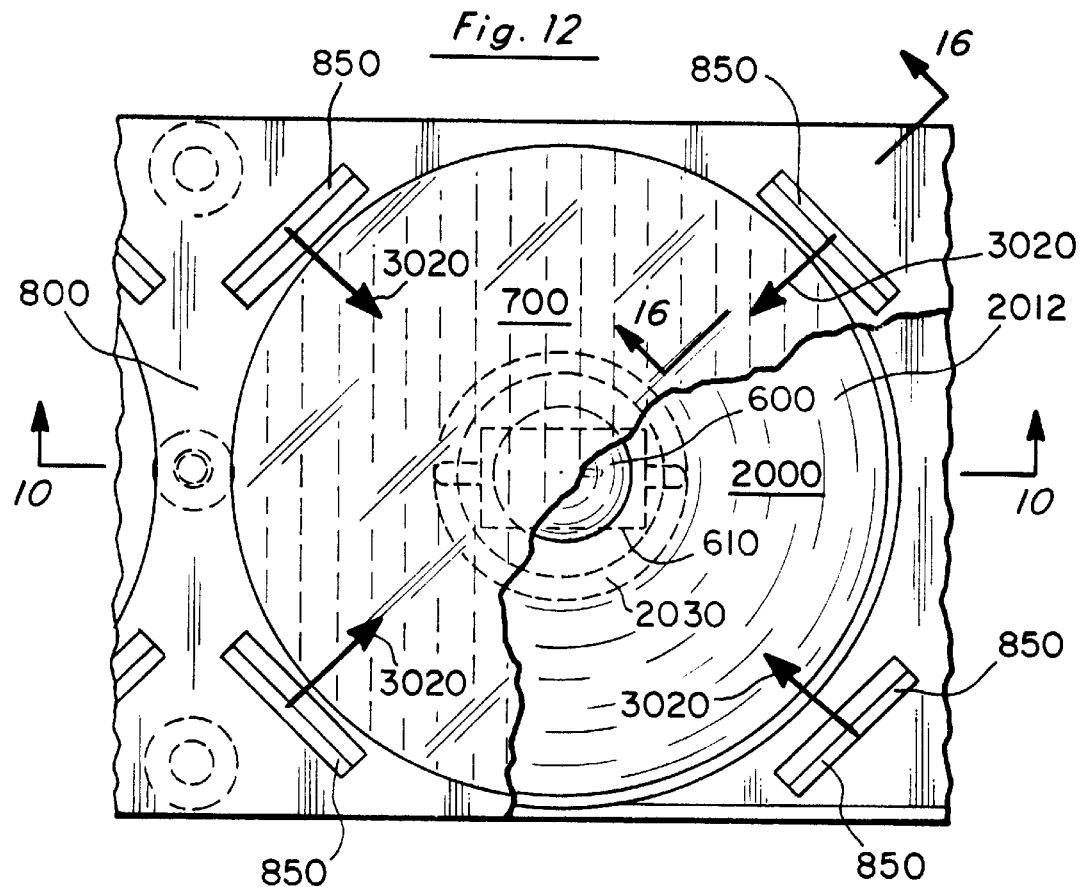
FIG. 12 is a partial cut-away front view of the second embodiment of the lighting unit of the present invention shown substantially along line 12—12 of FIG. 10.

The second embodiment of the lighting unit 300 comprises a light source 600, lens 700, and bezel 700 as shown in FIGS. 10, 11, and 12 and as described above for the first embodiment of the lighting unit 300. In the second embodiment of the lighting unit 300, the bulb 620 and filament 630 of the light source 600 extend into the reflector 2000 through the formed opening 2018 in the same manner as described above for the first embodiment. A narrow space 2024 remains between the bulb 620 and the edge 2020 of the formed opening 2018 in the reflector 2000. The relationship between the base of the light source 600 and the second section 2030 of the reflector 2000 is the same as described for the first embodiment of the lighting unit 300.

Placed over the open front of the reflector 2000 and in front of the light source 600 is the lens 700, as can be seen in FIGS. 10 and 11. A lip 730 extends beyond the edge 740 of the lens 700. The lip 730 abuts the rim 2022 of the reflector 2000 when the lens 700 is placed over the open front of the reflector 2000, as shown in FIG. 10. The lens 700 thus seals the open front 2014 of the reflector 2000.

Surrounding the open front 2014 of the reflector 2000 is the bezel 800, which can be best seen in FIG. 12. As described above in the first embodiment, the bezel 800 has a lip 810 that abuts the lip 730 of the lens 700 when the bezel is placed in front of the lighting unit 300 and that assists in holding the lens 700 in front of the reflector 2000. At least one vent 850 is cut into the bezel 800.

The shape of the shaped reflecting surface 2012 of the reflector 2000 in the second embodiment of the lighting unit 300 is identical to the shape of the shaped internal reflecting surface 540 of the reflector 500 in the first embodiment and has the same properties (that is, the reflector 2000 directs the emitted light in a predetermined pattern as shown in FIGS. 9A and 9B). The shaped reflecting surface 2012 is obtained by using the curve AB as described in FIG. 8 and discussed in detail above for the first embodiment, said curve being obtained by using the x-y values displayed in Table I above.

6. Cooling System of the Second Embodiment.

The cooling system of the second embodiment of the lighting unit 300 uses an air diffuser 3000 to direct the air introduced into the lighting unit 300 around the rear surface 2026 of the reflector 2000 and out through the vents 850 in the bezel 800. The air diffuser 3000 is illustrated in FIGS. 13 through 15.

As shown in FIG. 13, the air diffuser 3000 comprises a plurality of wells 3002 arranged along a substantially flat strip 3004. The strip 3004 has a protruding edge 3006 extending along the entire length of the strip, as can be seen in FIGS. 14 and 15. Each well 3002 has a wall 3008 that surrounds an opening 3010. FIG. 15 illustrates how the top of the wall 3008 is flush with the substantially flat surface of the strip 3004, and how the protruding edge 3006 of the strip 3004 extends above the wall 3008. At least one tab 3012 protrudes from the wall 3008 into the opening 3010. In the preferred embodiment, two tabs 3012 are placed one hundred and eighty degrees apart inside each well 3002, adjacent to the protruding edge 3006 of the strip 3004, as illustrated in FIG. 13. The tabs 3012 extend along the entire depth of the well 3002, as shown in FIG. 15. It should be understood that any number, shape, and arrangement of the tabs 3012 is contemplated under the teachings of the present invention.

The assembly of the lighting unit 300 with the air diffuser 3000 is illustrated in FIGS. 10 and 11. The second section 2030 of a lighting unit 300 is inserted into the opening 3010 of a well 3002. The air diffuser 3000 is attached to the lighting unit 300 by means of a conventional connector, for example, a screw 3014 as shown in FIG. 10. It is to be understood that other connectors and attachments are contemplated under the present invention and that the attachment of the air diffuser 3000 to the lighting unit 300 is not to be limited to any particular system described in this patent application.

FIG. 11 shows how the cylindrical region 2032 of the second section 2030 of the lighting unit 300 is supported and aligned in the well 3002 by the tabs 3012 protruding into the opening 3010 of the well 3002. Further support is provided by the protruding edge 3006 of the diffuser strip 3004. As can be seen in FIG. 11, projections 2028 on the rear surface 2026 of the first section 2010 of the lighting unit 300 abut the protruding edge 3006 of the air diffuser 3000 when the lighting unit 300 is inserted into the well 3002.

Figure 16:
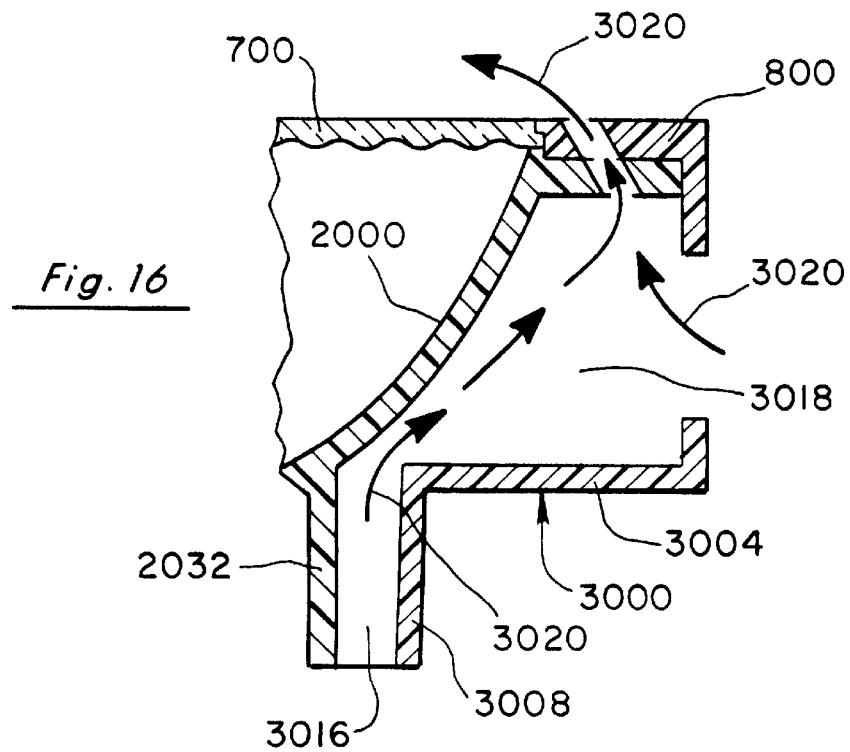
FIG. 16 is a partial cross-sectional view of the lighting unit shown substantially along line 16—16 of FIG. 12.

When the lighting unit 300 is inserted into the well 3002, a plenum 3016 is formed between the cylindrical region 2032 of the lighting unit 300 and the wall 3008 of the well 3002, as seen in FIG. 10. The plenum 3016 extends past the curved rear surface 2026 of the reflector 2000 to be in fluid communication with the area 3018 between the rim 2022 of the reflector 2000 and the overlying bezel 800, as can be seen in FIGS. 10 and 16. This extension 3018 of the plenum 3016 is formed when the bezel 800 is positioned surrounding the reflector 2000. The plenum 3016 is further in fluid communication with the vents 850 in the bezel 800, as shown in FIG. 16.

To provide the necessary cooling of the lighting unit 300, air is introduced into the display sign 100. The air can be supplied by, for example, a fan or by another source such as compressed air from a bottle or pump. The air is introduced into the passageway 2034 of the second section 2030 of the reflector 2000 as illustrated by the arrows 3020 in FIG. 16. The air then moves into the plenum 3016 and travels along the rear surface 2026 of the reflector 2000. As shown by the arrows 3020 in FIG. 16, the air then moves into the extension 3018 of the plenum 3016 between the rim 2022 of the reflector 2000 and the bezel 800. As described above, the bezel 800 contains a plurality of vents 850. In the second embodiment shown in FIG. 12, the bezel 800 contains four vents 850 spaced around each lighting unit 300. The air, after flowing along the rear surface 2026 of the reflector 2000 and picking up the heat radiated by the reflector 2000, exits the plenum 3016 through the vents 850 in the bezel 800, as shown in by the arrows 3020 in FIGS. 12 and 16. As discussed above, the reflector 2000 is preferably made from aluminum, which assists in the removal of heat.

The air is prevented from entering the interior of the reflector 2000 in the following manner. As described above, the bulb 620 of the light source 600 fits closely within the formed opening 2018 in the back 2016 of the reflector 2000, leaving only a narrow space 2024 between the bulb 620 and the edge 2020 of the formed opening 2018. As the air enters the lighting unit 300 as described above, initially a small amount of the air flows through the narrow space 2024 and into the sealed interior of the reflector 2000. As the air enters the reflector 2000, pressure builds up between the lens 700 and the reflector 2000.

In addition to the pressure increase obtained through the action of the air entering the interior of the reflector 2000, the pressure between the lens 700 and the reflector 2000 also increases when the air inside the reflector 2000 is heated by the light source 600, causing the air to expand. The pressure builds up until the air pressure between the lens 700 and the reflector 2000 substantially equals the air pressure of the air entering the lighting unit 300. When the pressures become substantially equal, no additional air is able to enter the sealed interior of the reflector 2000. Thus, the air entering the lighting unit 300 for cooling is substantially prevented from entering the interior of the reflector 2000 and depositing dust on the shaped reflecting surface 2012 of the reflector 2000, on the bulb 620, or on the light-incident surface 710 of the lens 700.

7. Angle of Lighting Units

In an effort to direct the light output of visual display signs toward viewers situated below the signs, previous display signs have in various ways angled parts or all of their lighting units downward. For example, shades located above the lighting units have been angled slightly downward from the horizontal plane to assist in directing the light output from the lighting unit toward a viewer on the ground below the display sign. The shades also have had mirrored surfaces to reflect light downward. In another method, the lighting units have been equipped with lenses in which the light-emitting surface was shaped to bend the light emitted from the reflector downward toward the viewer on the ground. In the patents cited hereinabove, the entire lighting unit was angled downward.

Figure 17:
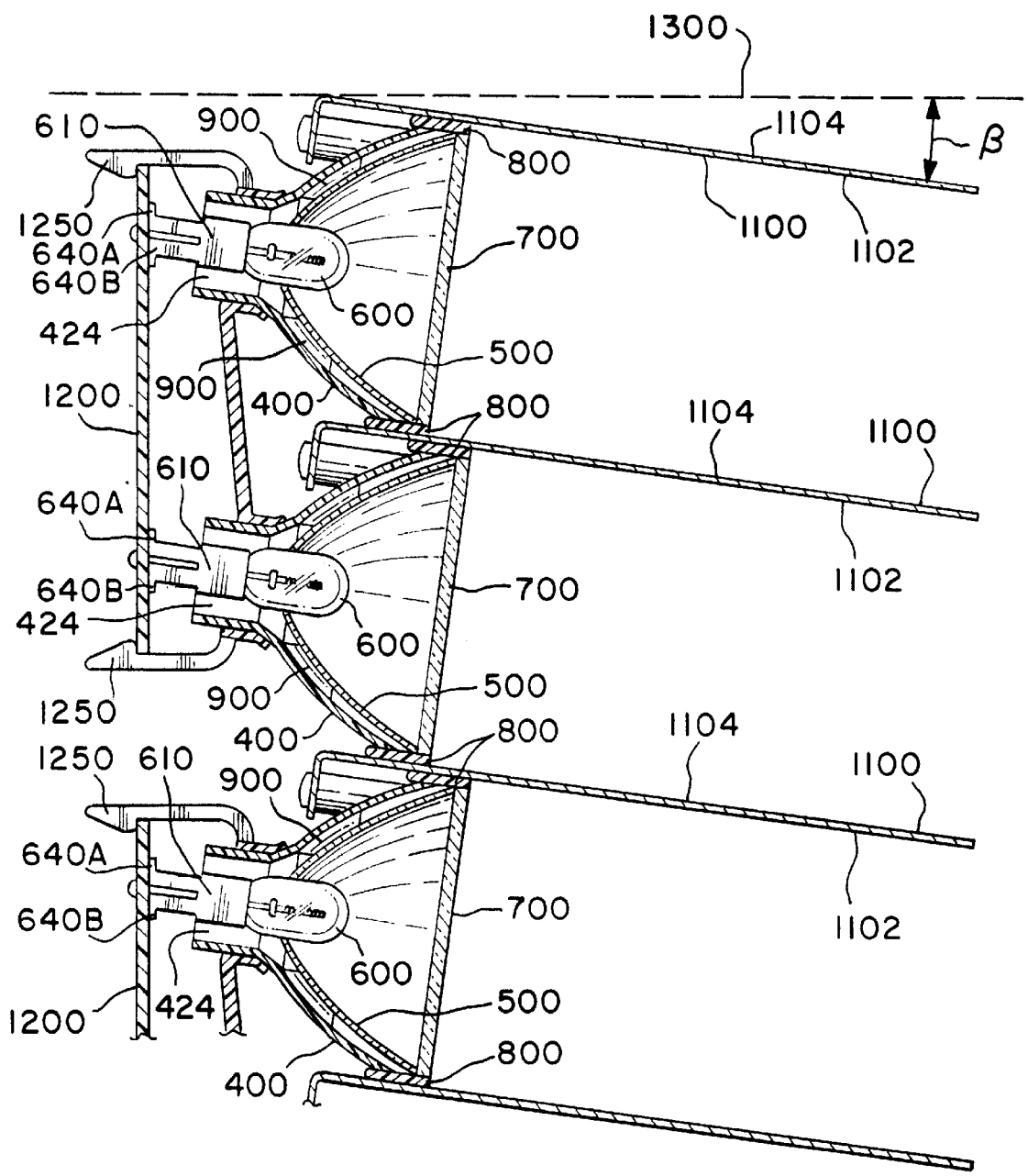
FIG. 17 is a partial cross-sectional view of several first-embodiment lighting units of the visual display sign in accordance with the present invention.
Figure 18:
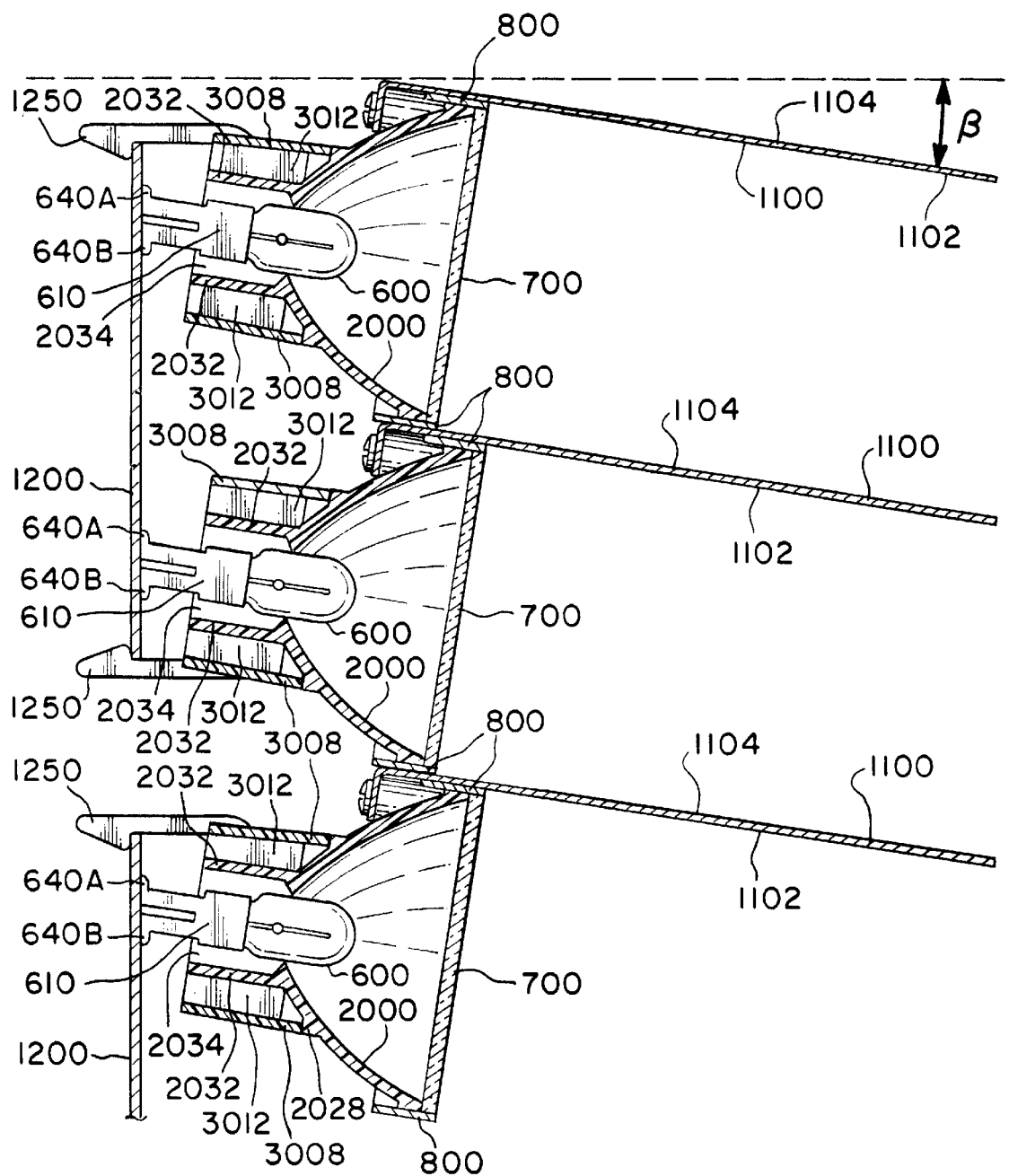
FIG. 18 is a partial cross-sectional view of several second-embodiment lighting units of the visual display sign in accordance with the present invention.

In the preferred embodiment according to the present invention, the entire lighting unit 300 including the shade 1100 is angled β slightly downward from the horizontal plane 1300, as shown in FIGS. 17 through 19. FIG. 17 illustrates the first embodiment of the lighting unit 300, and FIG. 18 illustrates the second embodiment of the lighting unit 300. Angle β is obtained as described below.

The visual display sign 100 is generally vertically oriented. A vertical backing 1200 supports the lighting units 300 and also acts as a circuit board for the electronic circuitry driving the light sources 600. A set of two lighting units 300, one above the other, each having its attendant shade 1100, are mounted onto the vertical backing 1200 by use of clips 1250. Each vertical backing 1200 holds two lighting units 300 vertically and eight lighting units 300 horizontally, making up one strip of the module 110 shown in FIG. 2. Four strips are arranged in vertical orientation to form the complete module 110 containing sixteen pixels 200 and sixty-four lighting units 300 illustrated in FIG. 2.

The angle β is obtained when the foot 640 of the light source 600 is attached to the vertical backing 1200. As mentioned above, the foot 640 has two opposing sides 640A and 640B of unequal length. The foot 640 is positioned on the vertical backing 1200 such that the longer side 640A of the foot 640 is located above the shorter side 640B. As a result, the entire lighting unit 300 and its attached shade 1100 achieve a downward angle β after attachment to the vertical backing 1200.

The angle β achieved by the lighting unit 300 when it is attached to the vertical backing 1200 is, in the preferred embodiment, an angle of about eight degrees downward from the horizontal plane 1300. It is to be understood that this angle β can vary and still achieve the same result, that is, an increase in the amount of light delivered to a viewer 10 below the sign 100. For example, the angle β can vary between about five degrees (5°) and about ten degrees. An angle β of eight degrees provides the optimum performance in terms of light delivery to ground-based viewers 10 by directing the emitted light downward toward the viewer 10 and, with the angled shade 1100, reducing glare and interference from ambient light sources such as sunlight, moonlight, starlight, car headlights, streetlights, windows, etc.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A lighting unit comprising:

a solid reflector having an open front, a back opposite said open front, a predetermined shaped reflecting surface, and a center axis, said open front having a circumference, said back of said solid reflector having an opening formed therein, said formed opening centered on said center axis; and an incandescent light source having a fixedly mounted but replaceble bulb, said bulb containing a filament therein, said filament having a top and a bottom, said filament further having a predetermined height, said bulb extending through said formed opening in said back of said solid reflector with the illuminated bottom of said filament substantially aligned with said formed opening and perpendicular to the center axis, said predetermined shaped reflecting surface configured from a set of predetermined curve reference points in relation to said predetermined height to maximally reflect light emitted from said predetermined height of said filament.

2. The lighting unit of claim 1 wherein said predetermined shaped reflecting surface reflects light emitted from said filament of said bulb about eight degrees to about twelve degrees beyond a plane delimited by the circumference of said open front of said reflector.

3. The lighting unit of claim 1 wherein said predetermined shaped reflecting surface reflects light emitted from said incandescent light source with an efficiency of about 60 percent.

4. The visual display sign of claim 1 wherein said predetermined shaped reflecting surface is obtained from a curve derived from the following set of coordinates, where x,y=0,0 is located on the center axis of said reflector where said center axis crosses said open front of said reflector:

| Curve Reference Point | x (inches) | y (inches) |
| --- | --- | --- |
| 1 | 0.0000 | −0.9000 |
| 2 | −0.0182 | −0.8917 |
| 3 | −0.0547 | −0.8750 |
| 4 | −0.0909 | −0.8580 |
| 5 | −0.1395 | −0.8345 |
| 6 | −0.1877 | −0.8105 |
| 7 | −0.2356 | −0.7858 |
| 8 | −0.2831 | −0.7603 |
| 9 | −0.3303 | −0.7341 |
| 10 | −0.3769 | −0.7071 |
| 11 | −0.4230 | −0.6792 |
| 12 | −0.4686 | −0.6504 |
| 13 | −0.5135 | −0.6205 |
| 14 | −0.5576 | −0.5896 |
| 15 | −0.6009 | −0.5574 |
| 16 | −0.6432 | −0.5240 |
| 17 | −0.6843 | −0.4892 |
| 18 | −0.7241 | −0.4528 |
| 19 | −0.7623 | −0.4147 |
| 20 | −0.7986 | −0.3749 |
| 21 | −0.8326 | −0.3331 |
| 22 | −0.8640 | −0.2892 |
| 23 | −0.8920 | −0.2432 |
| 24 | −0.9161 | −0.1950 |

5. A lighting unit comprising:

a solid reflector having an open front, a back opposite said open front, a predetermined shaped reflecting surface, and a center axis, said open front having a circumference, said back of said solid reflector having an opening formed therein, said formed opening centered on said center axis; and an incandescent light source having a fixedly mounted but replaceable bulb, said bulb containing a filament therein, said filament having a top and a bottom, said filament further having a predetermined height, said bulb extending through said formed opening in said back of said solid reflector with the illuminated bottom of said filament substantially aligned with said formed opening and perpendicular to the center axis said predetermined shaped reflecting surface configured from a set of predetermined curve reference points in relation to said predetermined height to reflect light emitted from said predetermined height of said filament with an efficiency of about 60 percent and about eight degrees to about twelve degrees beyond a plane delimited by the circumference of said open front of said solid reflector.

6. The visual display sign of claim 5 wherein said predetermined shaped reflecting surface is obtained from a curve derived from the following set of coordinates, where x,y=0,0 is located on the center axis of said reflector where said center axis crosses said open front of said reflector:

| Curve Reference Point | x (inches) | y (inches) |
| --- | --- | --- |
| 1 | 0.0000 | −0.9000 |
| 2 | −0.0182 | −0.8917 |
| 3 | −0.0547 | −0.8750 |
| 4 | −0.0909 | −0.8580 |
| 5 | −0.1395 | −0.8345 |
| 6 | −0.1877 | −0.8105 |
| 7 | −0.2356 | −0.7858 |
| 8 | −0.2831 | −0.7603 |
| 9 | −0.3303 | −0.7341 |
| 10 | −0.3769 | −0.7071 |
| 11 | −0.4230 | −0.6792 |
| 12 | −0.4686 | −0.6504 |
| 13 | −0.5135 | −0.6205 |
| 14 | −0.5576 | −0.5896 |
| 15 | −0.6009 | −0.5574 |
| 16 | −0.6432 | −0.5240 |
| 17 | −0.6843 | −0.4892 |
| 18 | −0.7241 | −0.4528 |
| 19 | −0.7623 | −0.4147 |
| 20 | −0.7986 | −0.3749 |
| 21 | −0.8326 | −0.3331 |
| 22 | −0.8640 | −0.2892 |
| 23 | −0.8920 | −0.2432 |
| 24 | −0.9161 | −0.1950 |

7. A lighting unit comprising:

a reflector having an open front, a back opposite said open front, a predetermined shaped reflecting surface, and a center axis, said open front of said reflector having a circumference, said back of said reflector having an opening formed therein, said formed opening centered on said center axis; and an incandescent light source having a bulb, said bulb containing a filament therein, said filament having a top and a bottom, said filament further having a predetermined height, said bulb extending through said formed opening in said back of said reflector with the bottom of said filament substantially aligned with said formed opening, wherein said predetermined shaped reflecting surface reflects light emitted from said predetermined height of said filament with an efficiently of about 60 percent and about eight degrees to about twelve degrees beyond a plane delimited by the circumference of said open front of said reflector;

said predetermined shaped reflecting surface being obtained from a curve derived from the following set of coordinates, where x,y=0,0 is located on the center axis of said reflector where said center axis crosses said open front of said reflector:

| Curve Reference Point | x (inches) | y (inches) |
| --- | --- | --- |
| 1 | 0.0000 | −0.9000 |
| 2 | −0.0182 | −0.8917 |
| 3 | −0.0547 | −0.8750 |
| 4 | −0.0909 | −0.8580 |
| 5 | −0.1395 | −0.8345 |
| 6 | −0.1877 | −0.8105 |
| 7 | −0.2356 | −0.7858 |
| 8 | −0.2831 | −0.7603 |
| 9 | −0.3303 | −0.7341 |
| 10 | −0.3769 | −0.7071 |
| 11 | −0.4230 | −0.6792 |
| 12 | −0.4686 | −0.6504 |
| 13 | −0.5135 | −0.6205 |
| 14 | −0.5576 | −0.5896 |
| 15 | −0.6009 | −0.5574 |
| 16 | −0.6432 | −0.5240 |
| 17 | −0.6843 | −0.4892 |
| 18 | −0.7241 | −0.4528 |
| 19 | −0.7623 | −0.4147 |
| 20 | −0.7986 | −0.3749 |
| 21 | −0.8326 | −0.3331 |

-continued

| Curve Reference Point | x (inches) | y (inches) |
| --- | --- | --- |
| 22 | −0.8640 | −0.2892 |
| 23 | −0.8920 | −0.2432 |
| 24 | −0.9161 | −0.1950 |

8. A lighting unit comprising:

a reflector having an open front, a back opposite said open front, a predetermined shaped reflecting surface, and a center axis, said open front having a circumference, said back of said reflector having an opening formed therein, said formed opening centered on said center axis; and an incandescent light source having a bulb, said bulb containing a filament therein, said filament having a top and a bottom, said filament further having a predetermined height, said bulb extending through said formed opening in said back of said reflector with the bottom of said filament substantially aligned with said formed opening, wherein said predetermined shaped reflecting surface maximally reflects light emitted from said predetermined height of said filament;

wherein said predetermined shaped reflecting surface reflects light emitted from said filament of said bulb about eight degrees to about twelve degrees beyond a plane delimited by the circumference of said open front of said reflector;

wherein said predetermined shaped reflecting surface reflects light emitted from said incandescent light source with an efficiency of about 60 percent; and wherein said predetermined shaped reflecting surface is obtained from a curve derived from the following set of coordinates, where x,y=0,0 is located on said center axis of said reflector where said center axis crosses said open front of said reflector:

| Curve Reference Point | x (inches) | y (inches) |
| --- | --- | --- |
| 1 | 0.0000 | −0.9000 |
| 2 | −0.0182 | −0.8917 |
| 3 | −0.0547 | −0.8750 |
| 4 | −0.0909 | −0.8580 |
| 5 | −0.1395 | −0.8345 |
| 6 | −0.1877 | −0.8105 |
| 7 | −0.2356 | −0.7858 |
| 8 | −0.2831 | −0.7603 |
| 9 | −0.3303 | −0.7341 |
| 10 | −0.3769 | −0.7071 |
| 11 | −0.4230 | −0.6792 |
| 12 | −0.4686 | −0.6504 |
| 13 | −0.5135 | −0.6205 |
| 14 | −0.5576 | −0.5896 |
| 15 | −0.6009 | −0.5574 |
| 16 | −0.6432 | −0.5240 |
| 17 | −0.6843 | −0.4892 |
| 18 | −0.7241 | −0.4528 |
| 19 | −0.7623 | −0.4147 |
| 20 | −0.7986 | −0.3749 |
| 21 | −0.8326 | −0.3331 |

-continued

| Curve Reference Point | x (inches) | y (inches) |
| --- | --- | --- |
| 22 | −0.8640 | −0.2892 |
| 23 | −0.8920 | −0.2432 |
| 24 | −0.9161 | −0.1950 |

9. A lighting unit comprising:

a reflector having an open front, a back opposite said open front, a predetermined shaped reflecting surface, and a center axis, said open front having a circumference, said back of said reflector having an opening formed therein, said formed opening centered on said center axis; and an incandescent light source having a bulb, said bulb containing a filament therein, said filament having a top and a bottom, said filament further having a predetermined height, said bulb extending through said formed opening in said back of said reflector with the bottom of said filament substantially aligned with said formed opening, wherein said predetermined shaped reflecting surface reflects light emitted from said predetermined height of said filament with an efficiency of about 60 percent and about eight degrees to about twelve degrees beyond a plane delimited by the circumference of said open front of said reflector;

wherein said predetermined shaped reflecting surface is obtained from a curve derived from the following set of coordinates, where x,y=0,0 is located on the center axis of said reflector where said center axis crosses said open front of said reflector:

| Curve Reference Point | x (inches) | y (inches) |
| --- | --- | --- |
| 1 | 0.0000 | −0.9000 |
| 2 | −0.0182 | −0.8917 |
| 3 | −0.0547 | −0.8750 |
| 4 | −0.0909 | −0.8580 |
| 5 | −0.1395 | −0.8345 |
| 6 | −0.1877 | −0.8105 |
| 7 | −0.2356 | −0.7858 |
| 8 | −0.2831 | −0.7603 |
| 9 | −0.3303 | −0.7341 |
| 10 | −0.3769 | −0.7071 |
| 11 | −0.4230 | −0.6792 |
| 12 | −0.4686 | −0.6504 |
| 13 | −0.5135 | −0.6205 |
| 14 | −0.5576 | −0.5896 |
| 15 | −0.6009 | −0.5574 |
| 16 | −0.6432 | −0.5240 |
| 17 | −0.6843 | −0.4892 |
| 18 | −0.7241 | −0.4528 |
| 19 | −0.7623 | −0.4147 |
| 20 | −0.7986 | −0.3749 |
| 21 | −0.8326 | −0.3331 |
| 22 | −0.8640 | −0.2892 |
| 23 | −0.8920 | −0.2432 |
| 24 | −0.9161 | −0.1950 |

* * * * *